US011645558B2

(12) United States Patent
Wang et al.

(10) Patent No.: US 11,645,558 B2
(45) Date of Patent: May 9, 2023

(54) AUTOMATIC MAPPING OF RECORDS WITHOUT CONFIGURATION INFORMATION

(71) Applicant: INTERNATIONAL BUSINESS MACHINES CORPORATION, Armonk, NY (US)

(72) Inventors: Qing Wang, Chappaqua, NY (US); Larisa Shwartz, Greenwich, CT (US); Srinivasan Parthasarathy, White Plains, NY (US); Jinho Hwang, Ossining, NY (US); Tengfei Ma, White Plains, NY (US); Michael Elton Nidd, Zurich (CH); Frank Bagehorn, Dottikon (CH); Jakub Krchák, Jindrichuv Hradec (CZ); Altynbek Orumbayev, Prague (CZ); Michal Mýlek, Vrané nad Vltavou (CZ); Ota Sandr, Prague (CZ); Tomáš Ondrej, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 16/869,647

(22) Filed: May 8, 2020

(65) Prior Publication Data
US 2021/0350253 A1    Nov. 11, 2021

(51) Int. Cl.
*G06N 5/04* (2023.01)
*G06N 20/00* (2019.01)
*G06F 16/901* (2019.01)

(52) U.S. Cl.
CPC ........... *G06N 5/04* (2013.01); *G06F 16/9024* (2019.01); *G06N 20/00* (2019.01)

(58) Field of Classification Search
CPC ........ G06N 5/04; G06N 20/00; G06N 3/0445; G06F 16/9024; G06F 7/023; G06F 30/27;
(Continued)

(56) References Cited

U.S. PATENT DOCUMENTS 6,522,768 B1   2/2003   Dekhil
9,805,111 B2  10/2017   Hjelm
(Continued)

FOREIGN PATENT DOCUMENTS

CN   104391697 A   3/2015
CN   110290120 A   9/2019

OTHER PUBLICATIONS

Abdel-Hamid et al., "Convolutional Neural Networks for Speech Recognition", IEEE/ACM Transactions on Audio, Speech, and Language Processing, vol. 22, No. 10, Oct. 2014, pp. 1533-1545.
(Continued)

*Primary Examiner* — Michael Won
(74) *Attorney, Agent, or Firm* — Teddi E. Maranzano

(57) ABSTRACT

A method, a computer system, and a computer program product for mapping operational records to a topology graph. Embodiments of the present invention may include generating an event frequent pattern using operational records. Embodiments of the present invention may include integrating topology-based event frequent patterns. Embodiments of the present invention may include mapping the operational records with an embedding engine. Embodiments of the present invention may include predicting incident events. Embodiments of the present invention may include receiving labeled patterns to the embedding engine for an active learning cycle.

15 Claims, 6 Drawing Sheets

(58) Field of Classification Search
CPC .... H04L 41/16; H04N 21/251; H04N 21/466; H04N 21/45; H04N 21/4662
See application file for complete search history.

(56) References Cited

U.S. PATENT DOCUMENTS

| | | | | |
|---|---|---|---|---|
| 10,181,032 | B1* | 1/2019 | Sadaghiani | G06N 5/003 |
| 10,880,182 | B1* | 12/2020 | Hermoni | H04L 41/0859 |
| 10,911,168 | B2* | 2/2021 | Studer | H04B 17/3912 |
| 10,970,636 | B1* | 4/2021 | Elwell | G06F 11/3688 |
| 11,295,131 | B1* | 4/2022 | Dhawan | G05B 13/027 |
| 11,457,031 | B1* | 9/2022 | Bisht | H04L 63/1425 |
| 2005/0210065 | A1* | 9/2005 | Nigam | G06F 16/35 |
| 2009/0252404 | A1* | 10/2009 | Lecerf | G06K 9/6254 382/154 |
| 2011/0078106 | A1 | 3/2011 | Luchi | |
| 2015/0222495 | A1* | 8/2015 | Mehta | G05B 23/0272 715/736 |
| 2015/0269050 | A1* | 9/2015 | Filimonov | G06N 20/10 702/183 |
| 2016/0088006 | A1* | 3/2016 | Gupta | H04L 43/08 706/12 |
| 2017/0085446 | A1 | 3/2017 | Zhong | |
| 2017/0124074 | A1* | 5/2017 | Cama | G06F 16/686 |
| 2018/0150758 | A1* | 5/2018 | Niininen | G06N 20/00 |
| 2018/0314936 | A1* | 11/2018 | Barik | G06N 3/084 |
| 2019/0182278 | A1 | 6/2019 | Das | |
| 2019/0260794 | A1 | 8/2019 | Woodford | |
| 2019/0372867 | A1 | 12/2019 | Palamari | |
| 2021/0294481 | A1* | 9/2021 | Morris | G06F 16/245 |
| 2021/0374569 | A1* | 12/2021 | Jezewski | G06N 20/00 |
| 2022/0027257 | A1* | 1/2022 | Harutyunyan | G06F 11/2257 |
| 2022/0075793 | A1* | 3/2022 | Jezewski | G06F 40/247 |

OTHER PUBLICATIONS

Alsuhaibani et al., "Joint Learning of Hierarchical word Embeddings from a Corpus and a Taxonomy", Automated Knowledge Base Construction (2019), Conference Paper, 18 pages.

Disclosed Anonymously, "System and Method for Predicting and Preventing Incidents with IT Service Management Platforms", An IP.com Prior Art Database Technical Disclosure, IP.com No. IPCOM000253179D, IP.com Electronic Publication Date: Mar. 12, 2018, 5 pages.

IBM, "Time series analysis—Semi-automated selection of arima model type and parameters", An IP.com Prior Art Database Technical Disclosure, Original Publication Date: Jul. 12, 2007, IP.com No. IPCOM000154702D, IP.com Electronic Publication Date: Jul. 12, 2007, 8 pages.

Inokuchi et al., "An Apriori-based Algorithm for Mining Frequent Substructures from Graph Data", 7 pages, European Conference on Principles of Data Mining and Knowledge Discovery, Conference paper, First Online: Jul. 18, 2002, PKDD 2000: Principles of Data Mining and Knowledge Discovery pp. 13-23.

Liu et al., "Leveraging Pattern Associations for Word Embedding Models", © Springer International Publishing AG 2017, DASFAA 2017, Part I, LCNS 10177, pp. 423-438.

Mell et al., "The NIST Definition of Cloud Computing", Recommendations of the National Institute of Standards and Technology, Special Publication 800-145, Sep. 2011, 7 pages.

* cited by examiner

AUTOMATIC MAPPING OF RECORDS WITHOUT CONFIGURATION INFORMATION

BACKGROUND

The present invention relates generally to the field of computing, and more particularly to cloud computing and active learning. Data management of operational records or operational logs may be used to track system and network errors. Operational records may also track analytics for the system and network infrastructure, application management in a cloud computing network, business operations, software analytics or data related to system security in a cloud or hybrid cloud network environment.

SUMMARY

Embodiments of the present invention disclose a method, a computer system, and a computer program product for mapping operational records to a topology graph. Embodiments of the present invention may include generating an event frequent pattern using operational records. Embodiments of the present invention may include integrating topology-based event frequent patterns. Embodiments of the present invention may include mapping the operational records with an embedding engine. Embodiments of the present invention may include predicting incident events. Embodiments of the present invention may include receiving labeled patterns to the embedding engine for an active learning cycle.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
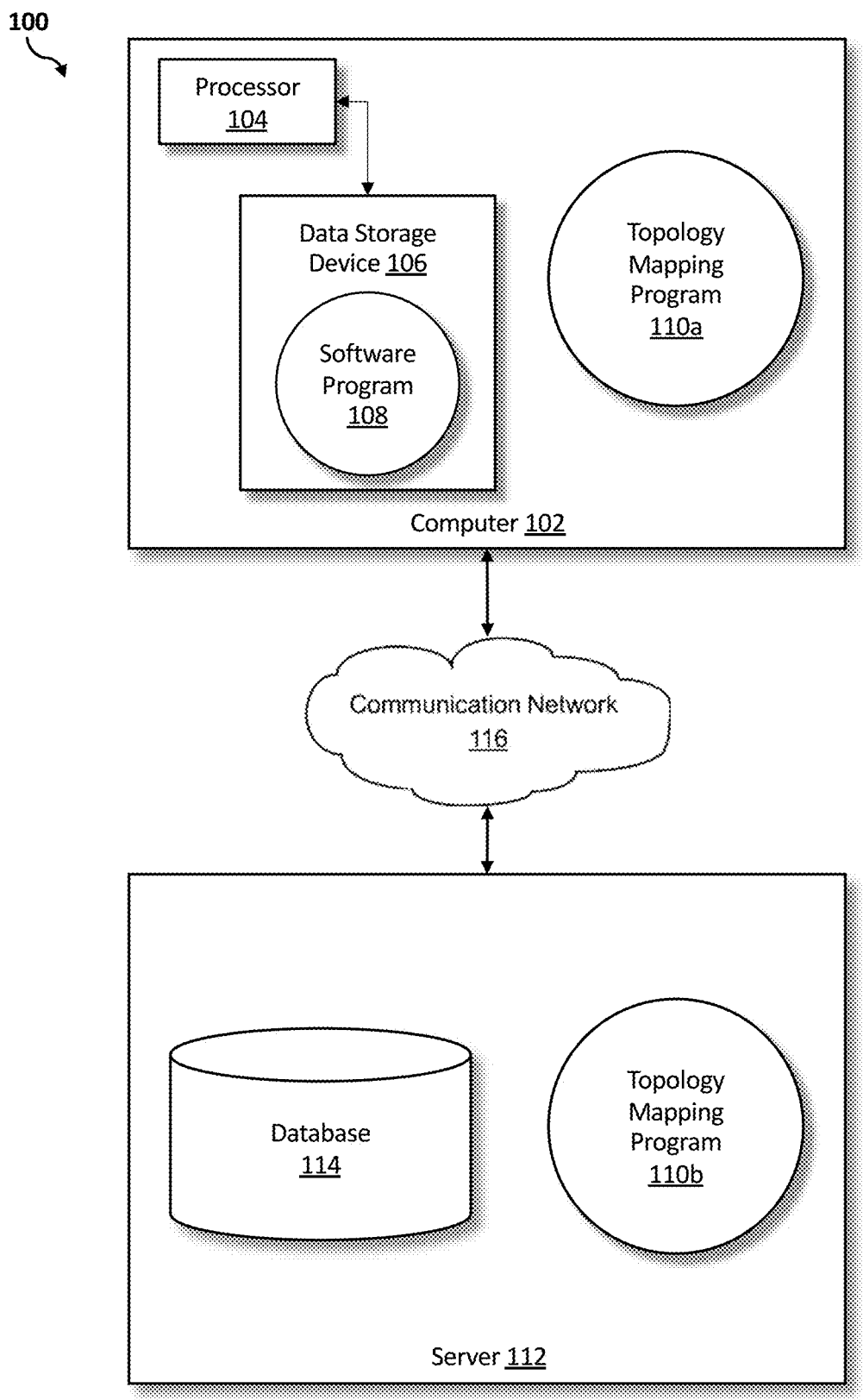
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, data management of operational records or operational logs may be used to track system and network errors. Operational records may also track analytics for the system and network infrastructure, application management in a cloud computing network, business operations, software analytics or data related to system security in a cloud or hybrid cloud network environment.

Operational records may include operational logs or alerts, system logs, network logs or a system that tracks network or application activity. The activity may include regular operation logs and the activity may include errors in the system. Operational records may include computing data pertaining to, for example, events, alerts, metrics, logs or messages.

Operational records may not be configured. Operational records that are not configured or that do not include configuration information are difficult to map to. Operational data, such as event data, notification data, log data and metric data, often do not contain critical configuration information. Configuration information may include, for example, location information or component information. Operational data that lacks configuration information (i.e., unconfigured operational data or records) may be difficult to map to a topology graph and may require domain knowledge from a subject matter expert (SME) to map the operational record to a topology graph.

An absence of configuration information in operational records creates an issue with mapping the records to a topology or attributing the operational data to a component or an infrastructure. For example, an issue with attributing operational data to a component or to an infrastructure hinders the execution of IT operations and service management such as diagnosis and remediation of an issue or a change in risk assessment.

Attributing the operational data to a component or infrastructure may be critical for a diagnosis and identifying issues or errors identified in the data. Attributing the operational data may include assigning topology information to operational data. An absence of topology information in operational records makes it difficult to map the operational records to a topology graph, which is critical for fully understanding operational record issues. For example, considering fault localization, a root cause may be found if alerts contain topology information. Therefore, it may be advantageous to, among other things, create a system, method and a program product that automatically maps or assigns operational records from cloud computing environments to a topology.

The following described exemplary embodiments provide a system, method and program product for automatic mapping in an active learning system. As such, embodiments of the present invention have the capacity to improve the field of information technology (IT) and cloud computing by providing a way to map operational records or assign IT operational records without configuration information to a topology graph and by creating an active learning system to automatically map the operational records using topology embedding. More specifically, the active learning system uses machine learning to predict incident events and an embedding system to train and map operational records to a topology.

Additional value of a topology mapping program includes real-time use of historical operational records and creates a proactive incident prediction as opposed to a reactive monitoring system. Value is also created by the topology mapping program's ability to detect the most vulnerable and risky devices and the components attached to the vulnerable and risky devices in a cloud environment.

According to an embodiment, graphs, such as topological graphs, may be used to map operational records. Topological graphs may include data to be represented as points, data points or nodes, and edges on a graph as opposed to vertices. A topology network may include an arrangement of nodes, the nodes may represent data and the lines or edges between the nodes may represent the connection between the data points, data or nodes.

For example, a topology in a cloud environment may use container networks, such as Kubernetes® containers (Kubernetes and all Kubernetes-based trademarks and logos are trademarks or registered trademarks of The Linux Foundation Non-Profit Corporation and/or its affiliates) or Docker® containers (Docker and all Docker-based trademarks and logos are trademarks or registered trademarks of Docker, Inc. and/or its affiliates). Using Kubernetes® terms as an example type, a node may have one or more vertical or hierarchal dependencies that are at a different level or a different physical dependency. For example, a node has a dependency to a service or ingress node and the service or ingress node has a dependency to pods and the pods have a dependency to storage. Nodes may include machine learning or deep learning representations of the dependencies.

Various types of machine learning models may be built to create predictive results for patterns, labels and events relating to operational records. Operational records may include records from various domains, such as retail, social media content, business, technology, medical, academic, government, industrial, food chain, legal or automotive. Machine learning models may also include deep learning models, active learning models and artificial intelligence (AI) models. Active learning may be used to interact with a user, such as the subject matter expert, to provide new data labels or label new datapoints.

According to an embodiment, machine learning (ML) may be used for pattern analysis and to predict patterns, labels and events. For example, trained models may predict event frequent patterns and event topology labels. Pattern analysis may be used to identify resource identification or resource information in an operational record. Patterns may be identified using the operational records and the model may learn node embeddings based on the identified patterns. A structure-based word embedding may be generated from a topology and may be used to train the model.

The structure-based word embedding may be performed or generated for one or more structure types. For example, one type of structure may discover frequent patterns of events from the same node using an Apriori algorithm. A second type of structure may discover frequent patterns of events from cross nodes in the topology using an Apriori-based subgraph frequent pattern mining algorithm. For example, event embedding may be learned by a model using discovered frequent patterns with an input layer, a hidden layer and an output layer. An example model that may be used includes a continuous bag-of-words (CBOW) based word embedding model. The generated patterns may be integrated into the word embedding learning model.

Training and updating a model may include supervised, unsupervised and semi-supervised machine learning procedures. Supervised learning may use a labeled dataset or a labeled training set to build, train and update a model. Unsupervised learning may use all unlabeled data to train a model. The unsupervised learning may indicate frequent pattern mining algorithms, such as the Apriori algorithm or the Apriori-based subgraph frequent pattern mining algorithm. Semi-supervised learning may use both labeled datasets and unlabeled datasets to train a model.

Supervised learning and semi-supervised learning may incorporate ground truth by having an individual check the accuracy of the data, data labels and data classifications. Individuals are typically a subject matter expert (SME) who has extensive knowledge in the particular domain of the dataset. The subject matter expert input may represent ground truth for the model and the provided ground truth may raise the accuracy of the model. The subject matter expert may correct, amend, update or remove the classification of the data or data labels by manually updating the labeled dataset. Models may improve in accuracy as datasets are corrected using ground truth.

The machine learning framework may include an evolving machine learning system that may begin with building rules from data that is available (i.e., no ground truth) and the system may become more accurate by building the labeled dataset. Type written or dialog-based feedback may be provided by the subject matter expert. For example, the feedback from the subject matter expert to update the dataset classifications is provided on a computing device user interface either verbally on a microphone or manually by type written words. Alternatively, a labeled dataset may be used to initially train the machine learning model for text classification and the dataset may be further enlarged using updated classifications and accuracy based on subject matter expert input in an active learning system.

Natural language processing may be utilized during the building, training and learning phases of a model. Analysis of both structured and unstructured data may be incorporated into the building, training and learning phases. Natural language processing may be used to analyze the quality of data or the feedback provided by a subject matter expert. Structured data may include data that is highly organized, such as configured operational records with topology information, a spreadsheet, relational database or data that is stored in a fixed field. Unstructured data may include data that is not organized and has an unconventional internal structure, such as unconfigured operational records without topology information, a portable document format (PDF), an image, a presentation, a webpage, video content, audio content, an email, a word processing document or multimedia content.

Historical data and current data (i.e., real-time data) may be used for the model building, training and learning phases. The historical data and current data may include operational data and topology data. Operational data includes, for example, operational records, events, notifications, logs or metrics. The operational data may be used to create a topology graph. The topology graph may provide data on the events that have happened that are represented on nodes. Topology data may include data on the topology graph, which may be events represented on nodes. Historical data may include topology data or information, for example, local information, local neighborhood information, historical records, training data, user or subject matter expert feedback, model performance levels and model learning curves.

Current data may include, for example, data collected from a monitoring system at a data center, such as IBM® Tivoli® (IBM Tivoli and all IBM Tivoli-based trademarks and logos are trademarks or registered trademarks of International Business Machines Corporation and/or its affiliates). Current data may be collected from various devices, such as an internet of things (IoT) device, a global positioning system (GPS), a sensor, a smart watch, a smart phone, a smart tablet, a personal computer or an automotive device.

According to an embodiment, the operational data and the topology data may be obtained from multiple databases or corpora for model training and model use. Updated or current operational data may continually be added to a corpus or a database for model training and use. Data may be retrieved from multiple databases and the various databases may include information from the multiple industries, may include public databases or may include private databases if proper accessibility permissions are provided.

For example, configured operational records may contain topology information, however, many operational records may be without configuration and without topology information. Configured operational records may be used as labeled data to train a classification model and the unconfigured operational records can be labeled using the trained classification model.

According to an embodiment, operational records are mapped without the need to be configured or without any configuration information. Additionally, operational records may be mapped automatically using node embedding as a vector representation of each node in a topology graph. Event groups and incident predictions in a cloud environment may be predicted using the built and trained models (e.g., machine learning models, active learning models, deep learning models or artificial intelligence models). For example, event groups may include frequent pattern mining from sequential events using the Apriori algorithm. Event embeddings may include vector representations of each event (i.e., text). A similarity between events and nodes may be calculated to find the highest similarity score to allow for an accurate mapping of an event to a node.

For example, an event mapping process may include event embedding as a low-dimensional latent representation of events generated from nodes. Node embedding may include a low-dimensional latent representation of nodes in a topology. The nodes may represent a resource, for example, a pod or a server name. The representations may be used as features for a wide range of tasks on topology, such as classification (e.g., event mapping and clustering).

Predictions may include a topology-based association that embeds pattern recognition techniques. Additionally, the accuracy of the predictions will continually improve and enrich the model learning system by using subject matter domain expert knowledge and by incorporating recognized incident patterns into a topology-based association embedding engine.

An example of an event issue in a cloud environment may include a part of an event, an event description that contains an event embedding and an event source or origin. The example presented is incomplete due to the lack of topology information. An example is provided as follows:

```
"alert_key": "c73aa29cef1046e381cb97529cce495f",
"body": {
    "cef_details": {
        "client": "LogDNA",
        "client_url": https://app.us-south.logging.cloud.ibm.com/,
```

-continued

```
        "creation_time": "2019-07-15T06:03:59.322Z",
        "description": "Assistant - Ingress 5xx - US South 50 lines",
        "message": "Assistant - Ingress 5xx - US South 50 lines",
        "mutations": [ ],
        "severity": "info",
        "source_origin":
            https://app.us-south.logging.cloud.ibm.com/<node_name>,
        "version": "1.0"
},..
```

An example of an unconfigured operational record, such as an alert that does not contain topology information (i.e., relation_ids is null or resource_id is null, or both), is provided as follows:

```
"P1C7573": {
    "created_at": "2019-09-05T09:56:56-04:00",
    "data_source": {
        "name": "Travis - Not Urgent",
        "data_source": {
            "name": "librato-travis-non-urgent",
            "data_source": null,
            "id": "PYC6E53",
            "target_url":
"https://api.pagerduty.com/services/PXXB6UG/integrations/PYC6E53",
            "type": "SourceApplication"
        },
        "id": "PXXB6UG",
        "target_url":
        "https://ibm.pagerduty.com/services/PXXB6UG",
        "type": "librato-travis-non-urgent"
    },
    "lifecycle_state": {
        "action": "Initial Read",
        "updated_by": {
            "id": "System",
            "type": "System"
        },
        "updated_at": "2019-11-01T11:57:52.324920",
        "value": "RESOLVED"
    },
    "original_key": "PXXB6UG",
    "severity": 4,
    "summary": "dead_chirp",
    "raw_alert_id": "P1C7573",
    "alert_group_ids": null,
    "application_id": "PagerDuty",
    "closed_at": null,
    "detail": null,
    "feedbacks": null,
    "id": "5c41d656-fcc0-11e9-9e94-acde48001122",
    "short_summary": "dead_chirp",
    "story_id": null,
    "relation_ids": null,
    "resource_id": null
}
```

Pagerduty® (PagerDuty and all PagerDuty-based trademarks and logos are trademarks or registered trademarks of PagerDuty Corporation and/or its affiliates).

An example of a configured operational record, such as an alert that does contain topology information (i.e., relation_ids has content or resource_id has content, or both), is provided as follows:

```
"PA02EX6": {
    "created_at": "2019-06-18T15:39:09-04:00",
    "data_source": {
        "name": "GitHub Enterprise - Non Urgent",
        "data_source": {
            "name": "librato-ghe-non-urgent",
            "data_source": null,
            "id": "P42QA99",
            "target_url": "https://api.pagerduty.com/services/P8GTEJY/integrations/P42QA99",
            "type": "SourceApplication"
        },
        "id": "P8GTEJY",
        "target_url": "https://ibm.pagerduty.com/services/P8GTEJY",
        "type": "librato-ghe-non-urgent"
    },
    "lifecycle_state": {
        "action": "Initial Read",
        "updated_by": {
            "id": "System",
            "type": "System"
        },
        "updated_at": "2019-11-01T11:57:59.023998",
        "value": "RESOLVED"
    },
    "original_key": "P8GTEJY",
    "severity": 4,
    "summary": "ghe.web.node.down",
    "raw_alert_id": "PA02EX6",
    "alert_group_ids": null,
    "application_id": "PagerDuty",
    "closed_at": null,
    "detail": null,
    "feedbacks": null,
    "id": "604008e0-fcc0-11e9-9e94-acde48001122",
    "short_summary": "ghe.web.node.down",
    "story_id": null,
    "relation_ids": [
        "-3000405215737637092",
        "-4136116757286351848"
    ],
    "resource_id": "-3000405215737637092"
}
```

GitHub® (GitHub and all GitHub-based trademarks and logos are trademarks or registered trademarks of GitHub Corporation and/or its affiliates).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a topology mapping program 110a. The networked computer environment 100 may also include a server 112 that is enabled to run a topology mapping program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the topology mapping program 110a, 110b may interact with a database 114 that may be embedded in various storage devices, such as, but not limited to a computer/mobile device 102, a networked server 112, or a cloud storage service.

According to an embodiment, a user using a client computer 102 or a server computer 112 may use the topology mapping program 110a, 110b (respectively) to automatically map operational data in an active learning topology embedding system. The topology embedding method is explained in more detail below with respect to FIGS. 2 and 3.

Figure 2:
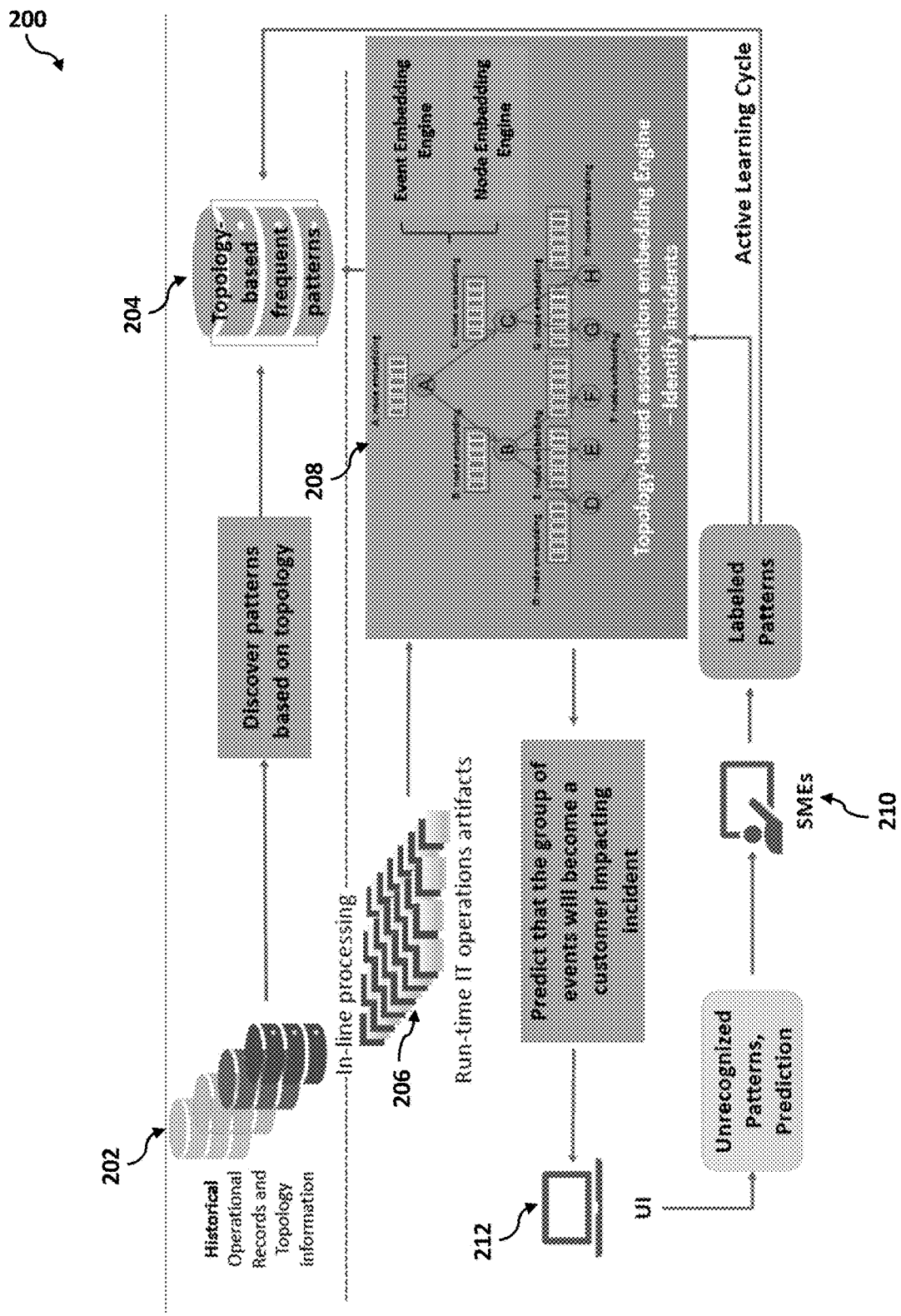
FIG. 2 is a block diagram of an example component map of an active learning topology mapping system according to at least one embodiment.

Referring now to FIG. 2, an example component map of an active learning topology mapping system used by the topology mapping program 110a, 110b according to at least one embodiment is depicted. The active learning topology mapping system may identify a resource for operational records that do not have resource information using a structure-based pattern recognition model.

For example, the active learning topology mapping system may obtain operational records that do not contain topology information and may predict the topology data. Resources may be identified based on the operational records in an instance when no direct interaction with a resource is possible. For example, an IP address or an identification string for a node may be identified based on the operational records. The structure-based pattern recognition model may be built using operational records and events information mapped to nodes.

The active learning topology mapping system may be considered a self-driven artificial intelligence engine that may derive, aggregate and harvest knowledge from multiple enterprise data-sources (e.g., system logs or alerts). The self-driven artificial intelligence engine may provide analyses of the technical incidents in the cloud environment using frequent pattern mining models and active learning.

Historical data may be retrieved from a historical database 202. The historical database 202 may store data such as local information, local neighborhood information, topology information, historical records, training data, user or subject matter expert feedback, model performance levels and model learning curves. The topology mapping program 110a, 110b may utilize the historical database 202 to retrieve, identify and analyze historical data to generate topology based frequent patterns.

The generated frequent patterns may be stored in a topology based frequent patterns database 204. The topology based frequent patterns database 204 may store the results of a pattern analysis. The frequent patterns may include, for example, event frequent patterns that are generated using local neighborhood information and topology information based on historical data. The IP operation artifacts 206 may assist in providing configuration operations data.

A topology-based association embedding engine 208 may be a module or model that includes an event embedding engine or a node embedding engine, or both. The event embedding engine may include a model that learns event embeddings by integrating discovered frequent patterns to a word embedding model. The event embedding may be represented as a vector of each event that was provided in text form. The node embedding engine may include a long short-term memory (LSTM) model as a classification problem. Each node in the node embedding may be represented as a vector on a topology graph. The similarity between the events and the nodes may be calculated to identify the highest similarity score and to map the event to the node. The long short-term memory (LSTM) model may learn the node embedding using the events that happened on a particular node. Each node may represent a class.

The topology-based association embedding engine 208 may be used to automatically map the operational records on a topology graph and may identify incidents from a time series of operational data. The technical incidents may be identified, automatically, from the topology-based pattern recognition engines.

Event frequent patterns may be generated using local neighborhood information and topology information based on historical data. The generated event frequent patterns may be considered topology-based event frequent patterns. The topology-based event frequent patterns may be integrated into a word embedding model to train the model to learn event embedding.

An example of frequent patterns discovered based on a topology may include two types of frequent patterns from historical records. One type of frequent pattern discovery may include frequent patterns of events from the same node using the Apriori algorithm. Another type of frequent pattern discovery may include frequent patterns of events from cross nodes in the topology using an Apriori-based subgraph frequent pattern mining algorithm.

The subject matter experts 210 may include an expert in a particular domain that provides feedback to the machine learning models. Feedback may be, for example, verifying model prediction results of frequent pattern mining. A subject matter expert 210 may provide labels for the training data by checking at the predicted event groups. For example, if prediction results provide a frequent pattern of an event group that should not be considered an event group, then the subject matter expert 210 may correct the results to use the correct event patterns as an input to the topology-based association embedding engine 208. The subject matter experts 210 may contribute to the model training and the model accuracy by providing feedback to the models.

The user interface 212 may include a computing device (e.g., client computer 102) that a user has access to. The user may include, for example, the subject matter expert 210 or a corporation, a government entity or an entity that is utilizing a subject matter expert 210 to access a topology mapping program 110a, 110b to update an active learning cycle.

Figure 3:
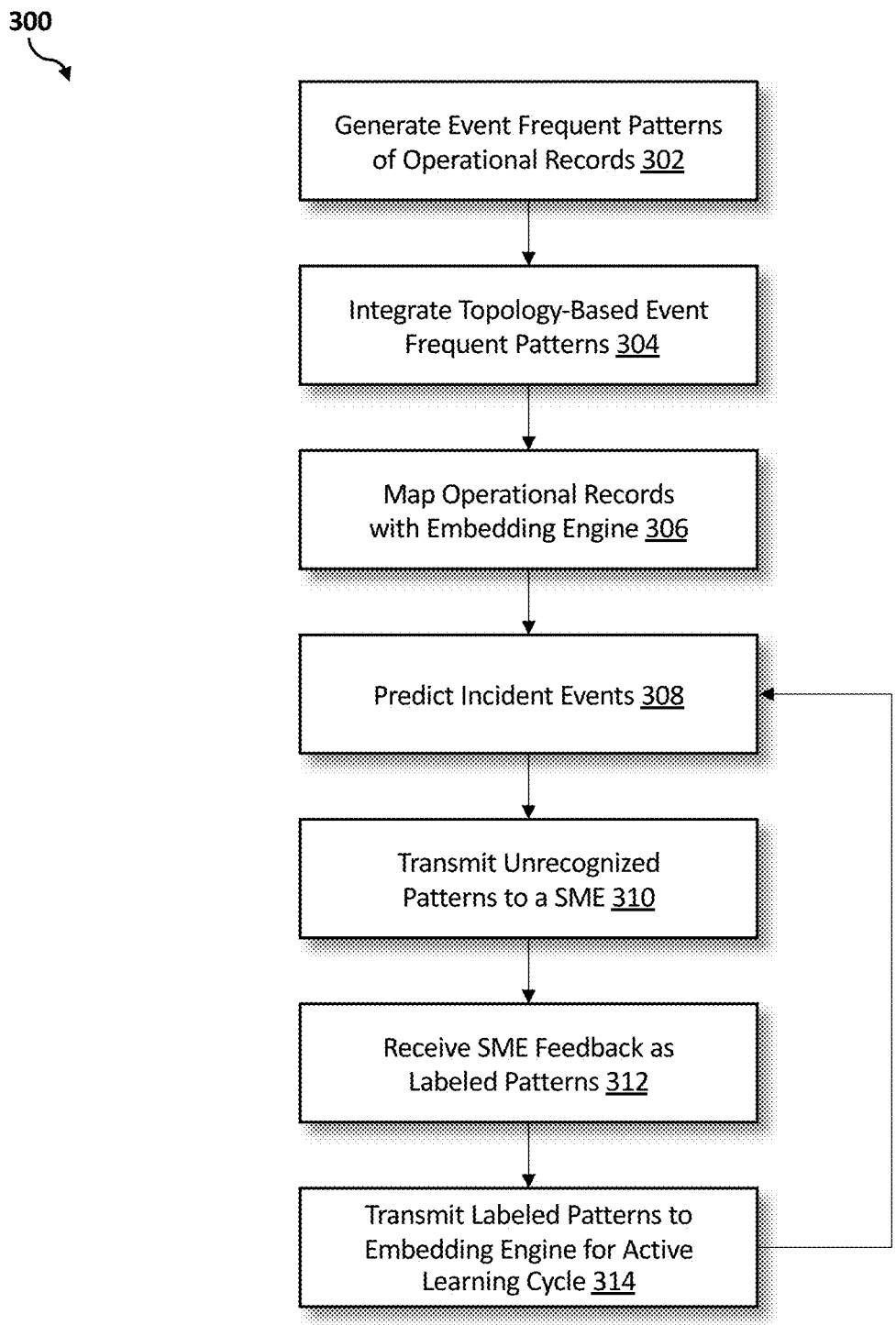
FIG. 3 is an operational flowchart illustrating a process for automatic operational records mapping in an active learning system according to at least one embodiment.

Referring now to FIG. 3, an operational flowchart illustrating the exemplary automatic operational records mapping process 200 used by the topology mapping program 110a, 110b according to at least one embodiment is depicted.

At 302, event frequent patterns of operational records are generated. The operational records are retrieved from the historical database 202 and the event frequent patterns may be generated using, for example, local neighborhood information (i.e., a neighborhood in the topology graph). Event frequent patterns may be learned, identified, discovered or generated based on a topology. For example, two types of frequent patterns from historical records include frequent patterns of events from the same node or frequent patterns of events from cross nodes in the topology. The frequent patterns of events from the same node may be generated using the Apriori algorithm. The frequent patterns of events from cross nodes may be generated using the Apriori-based subgraph frequent pattern mining algorithm.

At 304, topology-based event frequent patterns are integrated. The identified topology-based event frequent patterns are integrated into a word embedding model as training data for the model. The training data may assist in creating a model that is learning event embedding and node embedding using frequent patterns. The word embedding model may learn each event embedding. For example, a continuous bag-of-words (CBOW) based word embedding model is used to learn the event embeddings using the topology-based event frequent patterns.

At 306, the operational records are mapped with the embedding engine. The embedding engine may include the topology-based association embedding engine 208 that maps the frequent patterns from event embedding and node embedding to assist in training an active learning model to identify and predict incidents from a time series of operational data. The time series of operational data may include, for example, a series of data points that are indexed, listed or graphed in a time order. The embedding engine may include a model that learns event embeddings by integrating discovered frequent patterns to a word embedding model. For example, the node embedding engine may include a long short-term memory (LSTM) model as a classification problem.

A structure-based word embedding may be used to train the model to learn event embeddings. One embedding method for the structure-based word embedding may include an event's neighborhood information on the same node. For example, sequential events on one node, Node A, using the Apriori algorithm and using frequent event pattern sets. Another embedding method for the structure-based word embedding may include an event's topology information across different nodes. The similarities are calculated between the events and the nodes to find the highest similarity score and to use the similarity score to map the event to the node. For example, all sequential events in the topology are identified using the Apriori-based subgraph frequent pattern mining algorithm for cross-node frequent event pattern sets.

At 308, incident events are predicted. Incidents may include, for example, an issue or a real problem that can affect cloud performance. An operational record alert may differ from an incident such that the alert may not accurately represent or may not at all represent a real computing problem that can affect cloud performance. Incidents are predicted from the embedding engine and based on recognition of the topology-based frequent pattern mining model that has been built and trained. The model may predict incident events based on identifying the incident patterns from the historical operations records. The model may receive the event types as an input and the model may predict or provide incidents as an output.

An event may be an alert and the predicting model may find the critical event groups that may cause, now or in the future, a real problem (i.e., an incident). The input of operational records at step 302 may include an alert and a predictive output may include an incident after integrating the topology and the pattern matching with the topology-based association embedding engine 208.

At 310, unrecognized patterns are transmitted to a subject matter expert 210. The predicted incidents may be transmitted to a subject matter expert 210 for review and feedback. The subject matter expert 210 may provide feedback to unrecognized or unlabeled data, such as unlabeled timeseries charts or event groups.

At 312, subject matter expert feedback is received as labeled patterns. The subject matter expert 210 may provide feedback in the form of analyzing the unrecognized pattern data and labeling the data based on the expertise of the subject matter expert 210. For example, the subject matter expert 210 receives data unrecognized by the model, labels the data accordingly and feeds the data back into the model as a labeled dataset. The model may then be considered updated in labeled training data and may be able to make more accurate predictions using the new data provided by the subject matter expert 210.

At 314, the labeled patterns are transmitted to the embedding engine for an active learning cycle. The updated dataset made by the subject matter expert 210 is received by the model for an active learning cycle that continually updates as new data is processed either as labeled datasets or unlabeled datasets. For example, the labeled timeseries charts may be fed back into the model for updated training and predictions. The word embedding model may retrain the active learning model if new event frequent event patterns are identified. The node embedding model may also be retrained when new events are identified. The number of new identified events needed for retraining may be predetermined, for example, retraining may occur after a single new identified event or after a certain batch or a certain number of events have been identified.

The active learning cycle may be based on the updated classifications and new patterns. The updated classifications may be incorporated from subject matter expert feedback or from updated operational records data. For example, a labeled set of timeseries charts and an unlabeled set of timeseries charts may be produced from a model prediction and a multi-label classifier may be created based on the training data. Labels (e.g., an event group) may be predicted for charts, the charts will be asked by a subject matter expert 210 for validation of the event group of the charts, the training data will be updated again, and the model will be retrained again with a multi-label classifier again.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
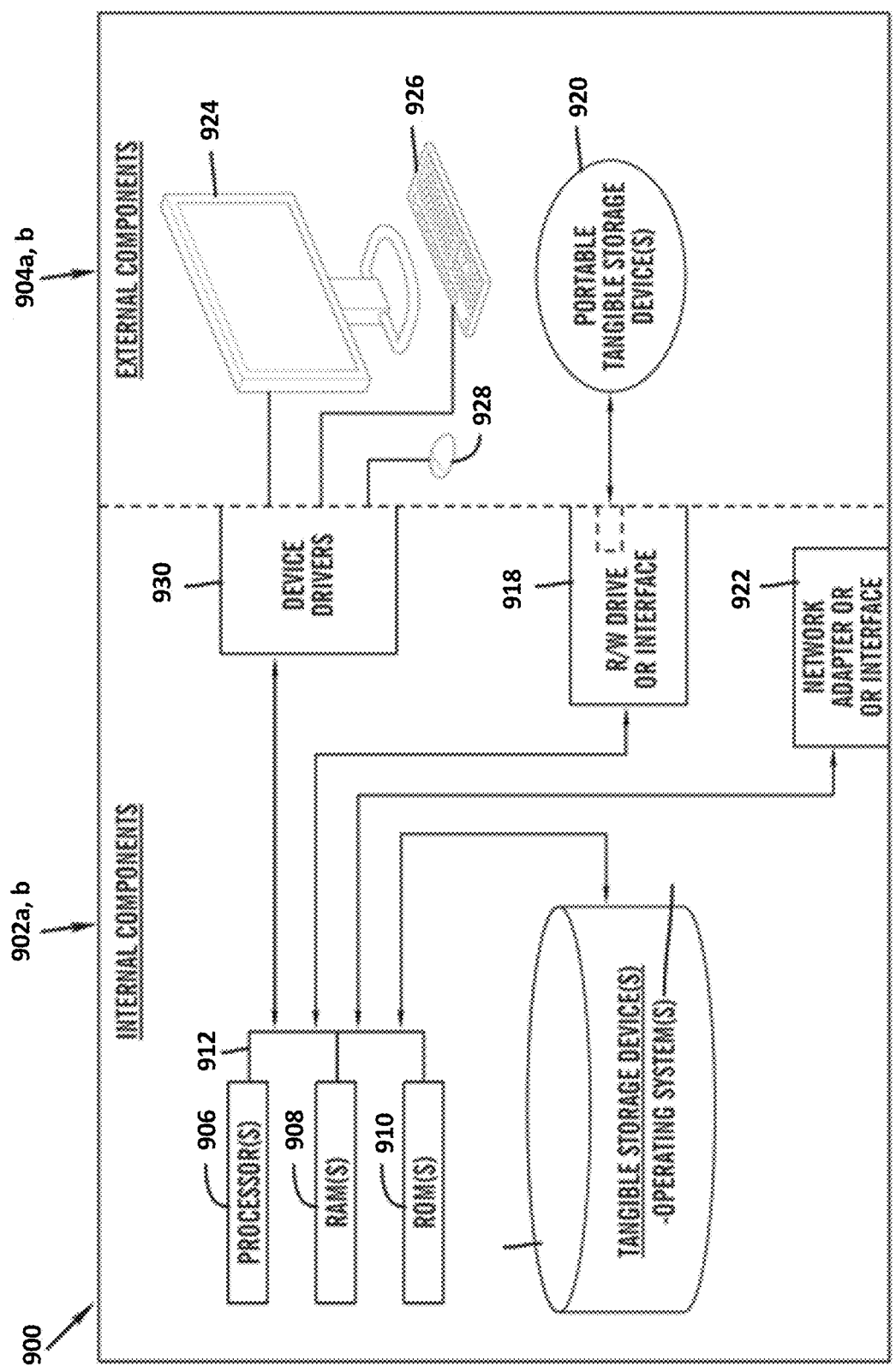
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the topology mapping program 110a in client computer 102, and the topology mapping program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the topology mapping program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the topology mapping program 110*a* in client computer 102 and the topology mapping program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the topology mapping program 110*a* in client computer 102 and the topology mapping program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
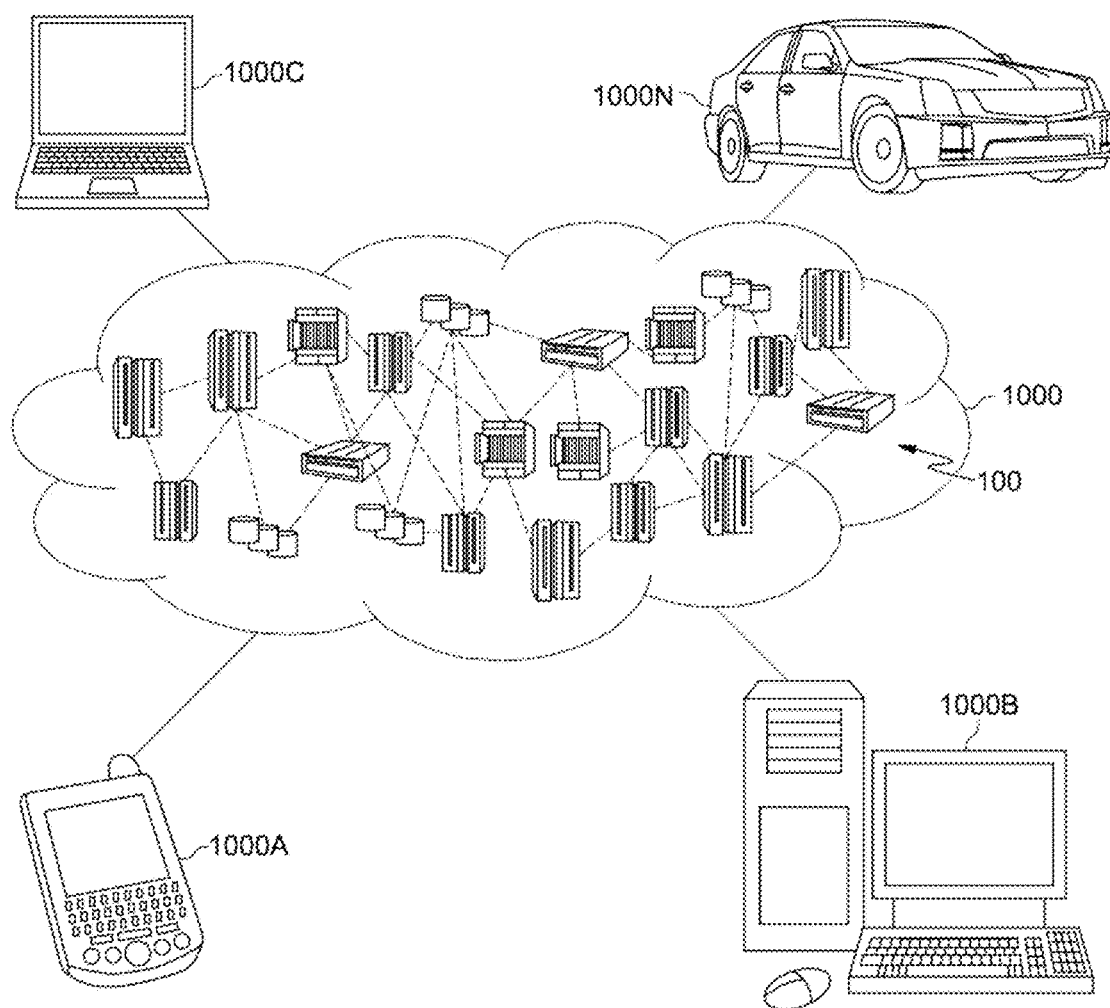
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
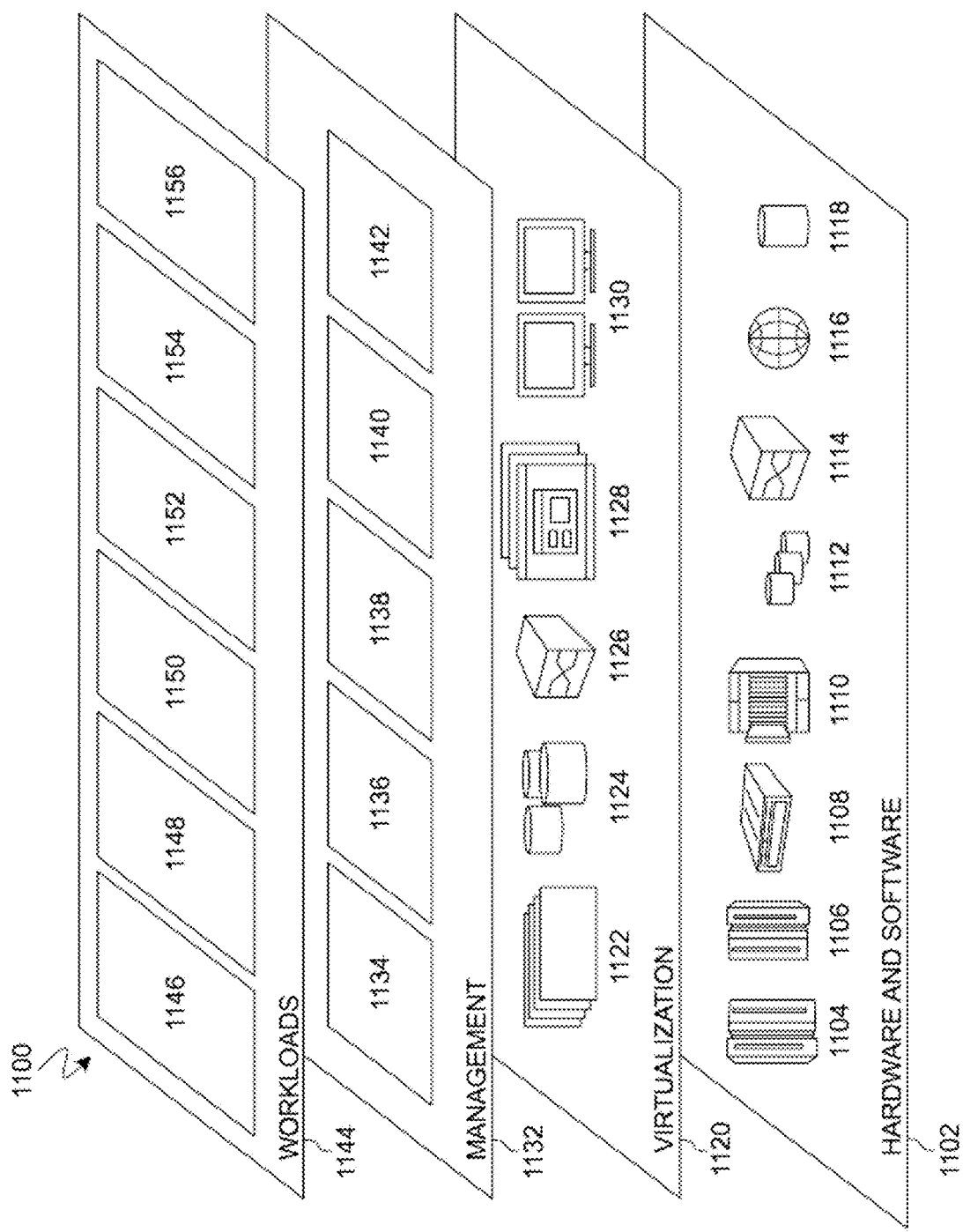
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and automatic mapping and topology mapping 1156. A topology mapping program 110a, 110b provides a way to automatically map operational records without configuration information to a topology graph.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   generating an event frequent pattern using operational records retrieved from a historical database of operational records, wherein the event frequent pattern is generated using local neighborhood information;
   integrating topology-based event frequent patterns into a word embedding model;
   automatically mapping the operational records with a word embedding engine;
   predicting incident events; and
   receiving labeled patterns to the embedding engine for an active learning cycle.

2. The method of claim 1, wherein the event frequent patterns are generated from a same node.

3. The method of claim 1, wherein the event frequent patterns are generated from cross nodes.

4. The method of claim 1, wherein the operational records do not contain configuration information.

5. The method of claim 1, wherein the embedding engine uses a topology-based association embedding engine to map the event frequent patterns from an event embedding and a node embedding to train a model.

6. A computer system comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

generating an event frequent pattern using operational records retrieved from a historical database of operational records, wherein the event frequent pattern is generated using local neighborhood information;

integrating topology-based event frequent patterns into a word embedding model;

automatically mapping the operational records with a word embedding engine;

predicting incident events; and receiving labeled patterns to the embedding engine for an active learning cycle.

7. The computer system of claim 6, wherein the event frequent patterns are generated from a same node.

8. The computer system of claim 6, wherein the event frequent patterns are generated from cross nodes.

9. The computer system of claim 6, wherein the operational records do not contain configuration information.

10. The computer system of claim 6, wherein the embedding engine uses a topology-based association embedding engine to map the event frequent patterns from an event embedding and a node embedding to train a model.

11. A computer program product comprising:

one or more computer-readable tangible storage media and program instructions stored on at least one of the one or more computer-readable tangible storage media, the program instructions executable by a processor to cause the processor to perform a method comprising:

generating an event frequent pattern using operational records retrieved from a historical database of operational records, wherein the event frequent pattern is generated using local neighborhood information;

integrating topology-based event frequent patterns into a word embedding model;

automatically mapping the operational records with a word embedding engine;

predicting incident events; and receiving labeled patterns to the embedding engine for an active learning cycle.

12. The computer program product of claim 11, wherein the event frequent patterns are generated from a same node.

13. The computer program product of claim 11, wherein the event frequent patterns are generated from cross nodes.

14. The computer program product of claim 11, wherein the operational records do not contain configuration information.

15. The computer program product of claim 11, wherein the embedding engine uses a topology-based association embedding engine to map the event frequent patterns from an event embedding and a node embedding to train a model.

* * * * *